US012679053B2

(12) United States Patent
Aguire et al.

(10) Patent No.: US 12,679,053 B2
(45) Date of Patent: Jul. 14, 2026

(54) PRODUCTION OF POLYMERIC FILM

(71) Applicant: Inteplast Group Corporation, Livingston, NJ (US)

(72) Inventors: Joseph Aguire, Simpsonville, SC (US); Scott Coffey, Whitesburg, TN (US); Rafael E. Bayona P., Morristown, TN (US); Jiangshan Sun, Simpsonville, SC (US)

(73) Assignee: INTEPLAST GROUP CORPORATION, Livingston, NJ (US)

( * ) Notice: Subject to any disclaimer, the term of this patent is extended or adjusted under 35 U.S.C. 154(b) by 162 days.

(21) Appl. No.: 18/627,721

(22) Filed: Apr. 5, 2024

(65) Prior Publication Data

US 2025/0312980 A1     Oct. 9, 2025

(51) Int. Cl.
| | |
|---|---|
| *B29C 55/14* | (2006.01) |
| *B29C 55/00* | (2006.01) |
| *B29C 55/12* | (2006.01) |
| *B29C 55/16* | (2006.01) |
| *B29C 55/18* | (2006.01) |
| *B29C 71/02* | (2006.01) |
| *F26B 3/28* | (2006.01) |
| *F26B 13/10* | (2006.01) |
| *F27B 9/14* | (2006.01) |
| *F27B 9/28* | (2006.01) |
| *F27D 21/00* | (2006.01) |
| *G21K 5/00* | (2006.01) |
| *B29C 37/00* | (2006.01) |
| *F27D 19/00* | (2006.01) |

(52) U.S. Cl.
CPC ............ *B29C 71/02* (2013.01); *B29C 55/005* (2013.01); *B29C 55/12* (2013.01); *B29C 55/18* (2013.01); *F27B 9/145* (2013.01); *F27D*

*21/0014* (2013.01); *B29C 2037/90* (2013.01); *B29C 2071/022* (2013.01); *B29K 2023/06* (2013.01); *F27D 2019/0028* (2013.01)

(58) Field of Classification Search
CPC ....... B29C 55/12; B29C 55/14; B29C 55/143; B29C 55/146; B29C 55/16; B29C 55/165; B29C 71/02; B29C 2037/90; B29K 2023/06; F26B 3/28; F26B 13/10; F27B 9/145; F27B 9/28; F27D 2019/0028; F27D 21/0014; G21K 5/00
USPC ... 264/40.6, 234, 235, 235.8, 290.2, 331.17, 264/345; 425/445, 143; 26/72, 73; 250/492.1, 493.1, 494.1; 432/8, 18, 49, 432/59, 121, 230
See application file for complete search history.

(56) References Cited

U.S. PATENT DOCUMENTS

| | | | | |
|---|---|---|---|---|
| 3,261,903 A | * | 7/1966 | Carr ...................... | B29C 55/146 26/72 |
| 3,676,539 A | * | 7/1972 | Fisher ................... | B29C 55/165 26/73 |

(Continued)

OTHER PUBLICATIONS

Casso-Solar Technologies, "Thermoforming Oven", retreived from https://www.cassosolartechnologies.com/industrial-ovens/ thermoforming-oven, Feb. 16, 2024, 2 pages.

*Primary Examiner* — Leo B Tentoni
(74) *Attorney, Agent, or Firm* — Stinson LLP

(57) ABSTRACT

A method and system for production of polymeric film. Radiant heat is applied in a controlled manner to the film to control the heating of the film so that desirable processing, such as annealing may be carried out.

19 Claims, 6 Drawing Sheets

(56) References Cited

U.S. PATENT DOCUMENTS

| | | | |
|---|---|---|---|
| 5,575,968 A * | 11/1996 | Seo | ........................ B29C 71/02 |
| | | | 264/235.8 X |
| 6,946,203 B1 | 9/2005 | Lockhart et al. | |
| 8,231,823 B2 | 7/2012 | Humele et al. | |
| 8,546,277 B2 | 10/2013 | Plantamura | |
| 10,857,722 B2 | 12/2020 | Cochran et al. | |
| 2022/0402192 A1 | 12/2022 | Aubee et al. | |

* cited by examiner

PRODUCTION OF POLYMERIC FILM

FIELD

The present disclosure generally relates to the production of polymeric film.

BACKGROUND

The production of polymeric films, as well as the use of such films to produce articles of manufacture requires substantial automated handling. Much of the handling is accomplished by having the polymeric film pass over rollers. The rollers handle the film for proper positioning in manufacture. However, in addition to that the rollers can be used for affecting the material properties of the film, such as by stretching the film in a controlled manner.

It is common to pass biaxially oriented polypropylene over roller which are heated in order to introduce the desired material properties of the film. Roller temperatures for polypropylene exceed the melting temperature of the skin layer of the film. This works well for polypropylene, but not so well for polyethylene. Polyethylene will stick to the roller at these temperatures, which can cause the skin layer to peel off in certain locations. Polyethylene does not transfer heat as well as polypropylene, making it more difficult to heat up the needed temperature. Making the roller hotter than for polypropylene exacerbates the problem of sticking and peeling of polyethylene.

SUMMARY

In one aspect, a method of making a biaxially oriented polymer film generally comprises feeding a film of polymer material to material handling rollers. The film has a length, a width, longitudinal edge margins and a central portion bounded by the longitudinal edge margins. The film is passed from one of the material handling roller to the next through a heating zone. Heat is applied to the film in the heating zone such that more heat is applied to the longitudinal edge margins than to the central portion of the film.

In another aspect of the present invention, a method of making a biaxially oriented polyethylene film generally comprises feeding a film of polyethylene material to material handling rollers. The film has a length, a width, longitudinal edge margins and a central portion bounded by the longitudinal edge margins. The film is passed from one of the material handling roller to the next through a heating zone. Radiant heat is applied to the film in the heating zone, which includes plural heating sections. The heating sections are independently controlled to applying different amounts of heat to the film as the film passing through the heating section.

In still another aspect of the present invention, a heating system for producing polymer film generally comprises a frame forming a passageway sized and shaped to receive a web of film into and through the frame. The web of film has longitudinal edge margins and a central portion between the longitudinal edge margins. Heating units are arranged along a length of the passageway for applying radiant heat from the heating units to the film passing through the passageway. The heating units are independently controllable for applying different amounts of heat to different portions of the passageway along the length of the passageway. At least some of the heating units are positioned for applying heat preferentially to the longitudinal edge margins of the film.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
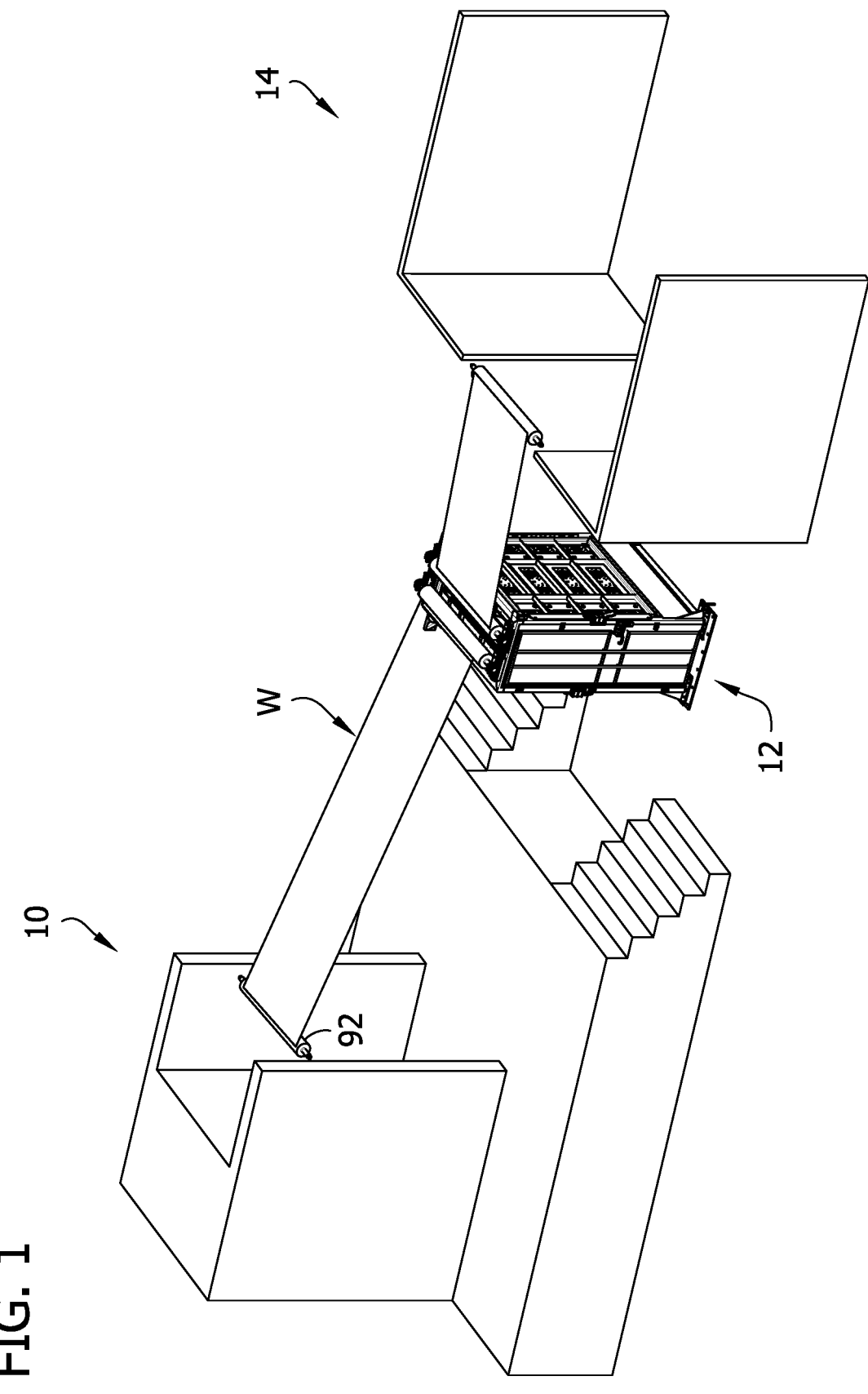
FIG. 1 is a schematic perspective of a portion of a polyethylene film production line including a heating system.

Referring now to the drawings and in particular to FIG. 1, a manufacturing set up for the production of polyethylene film is shown to include a polyethylene film delivery unit 10, a heating system 12 and a processed polyethylene film receiving unit 14. The polyethylene film delivery unit 10 can be an apparatus that produces the film, or simply one that holds the film waiting for processing by the heating system 12. The polyethylene film delivery unit 10 may also perform another treatment on the polyethylene film prior to it being send through the heating system. It will be understood that the polyethylene film received by the processed polyethylene film receiving unit 14 can be subject to further processing within the scope of the present invention. The construction and operation of the polyethylene film delivery unit 10 and the polyethylene film receiving unit 14 are well understood by those of ordinary skill in the art and will not be further described herein. The person having ordinary skill will also readily recognize variations of these units 10, 12 that are possible in the art. As illustrated in FIG. 1, the polyethylene film delivery unit 10 fees out a web W of polyethylene film that passes through the heating system 12 and thence to the polyethylene film receiving unit 14. Although this description refers to the production of polyethylene film, the apparatus and methods of the present invention can be used for other polymeric film production and processing.

Figure 2:
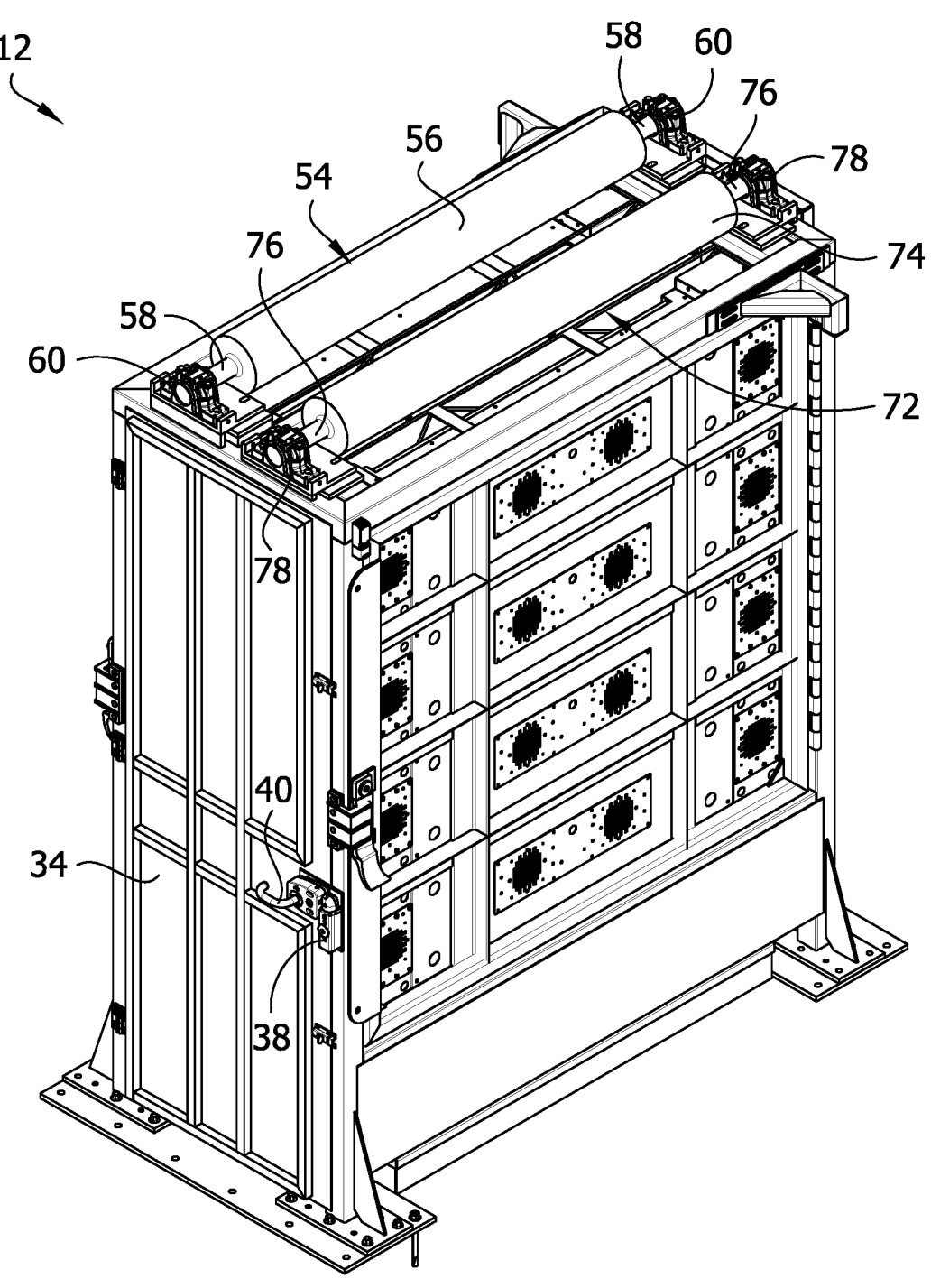
FIG. 2 is an enlarged perspective of the heating system.
Figure 3:
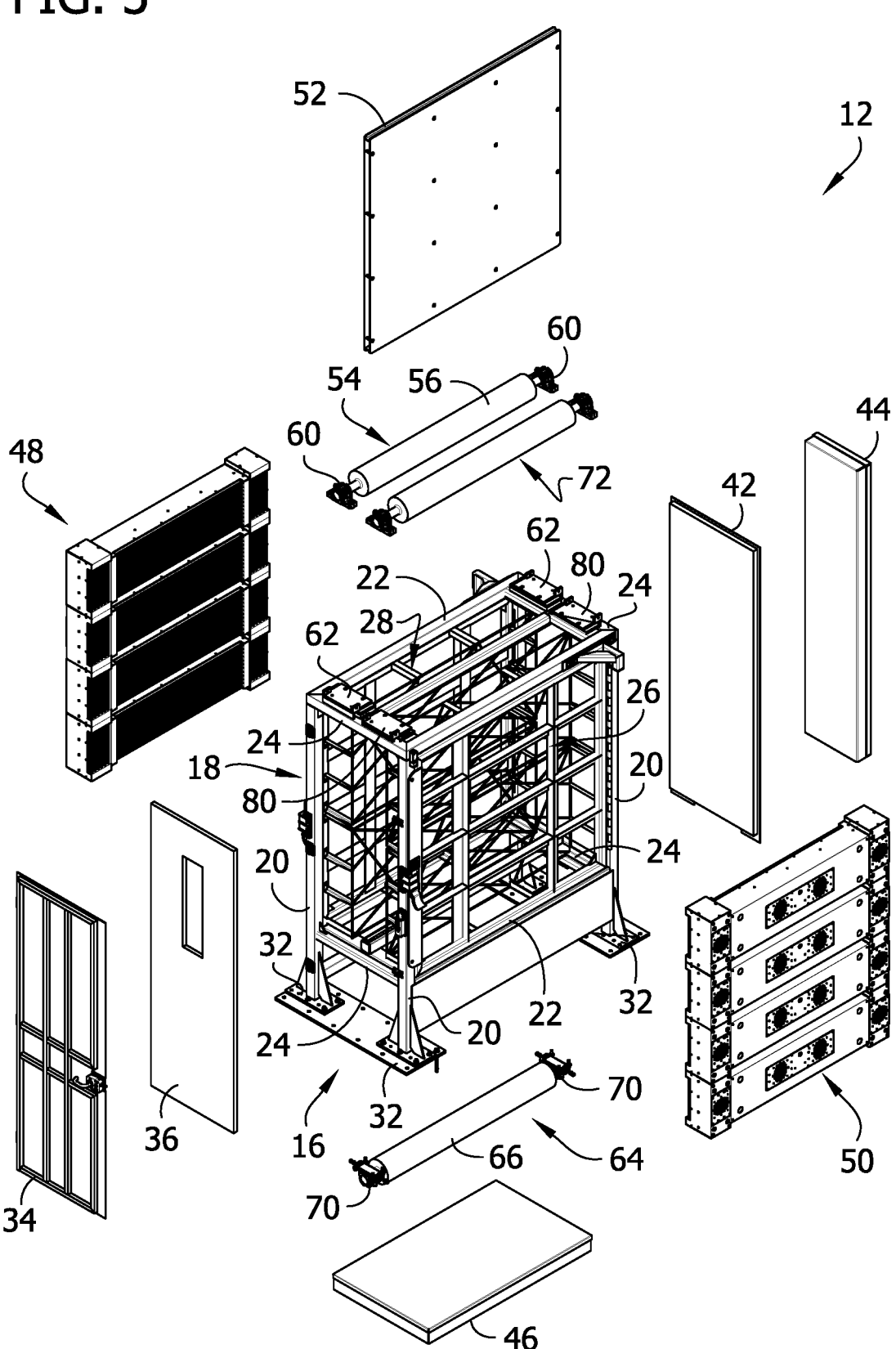
FIG. 3 is an exploded perspective of the heating system.

FIGS. 2 and 3 show the heating system 12 in further detail and on a larger scale. The heating system 12 includes a frame 16 including a box structure 18 having the form of a rectangular parallelepiped. The box structure 18 includes four vertical members 20 located at the corners of the box structure, four long horizontal members 22 extending between respective pairs of the vertical members spaced farther apart, and four short horizontal members 24 extending between other pairs of vertical members spaced more closely to each other. Additional frame members form larger side grids 26 on the longest sides of the box structure 18, and a smaller top grid 28. The top grid defines an entry opening that lead into a passageway 30 within the box structure 18 that receives the web W of the polyethylene film into an out of the heating system 12. The top grid 28 also defines an exit opening leading out of the passageway 30 through the box structure 18. The four vertical members extend down to feet 32 that support the box structure 18 above the floor of the factory. The feet 32 are constructed so that the heating system 12 can be secured to the factory floor by bolts or other suitable connection.

On the nearer narrow side of the box structure 18 is mounted a door 34 that carries a door insulation pad 36. The door 34 is hingedly mounted on the left side to one of the vertical members 20. On the right side, a latch receptacle 38 is mounted that receives a latch of a door handle 40 mounted on the door 34. The door can be opened to permit inspection of the interior of the box structure 18 and closed to provide thermal insulation to the interior of the box structure. An insulated panel 42 closes the opposite narrow side of the box structure 18. The frame also mounts a first cable tray 44 for routing electrical power lines, control lines and the like that are used in the operation and control of the heating system 12. A second cable tray 46 is mounted on the underside of the box structure 18 and is also constructed for routing electrical power lines, control lines and the like used in the operation and control of the heating system 12.

Figure 4:
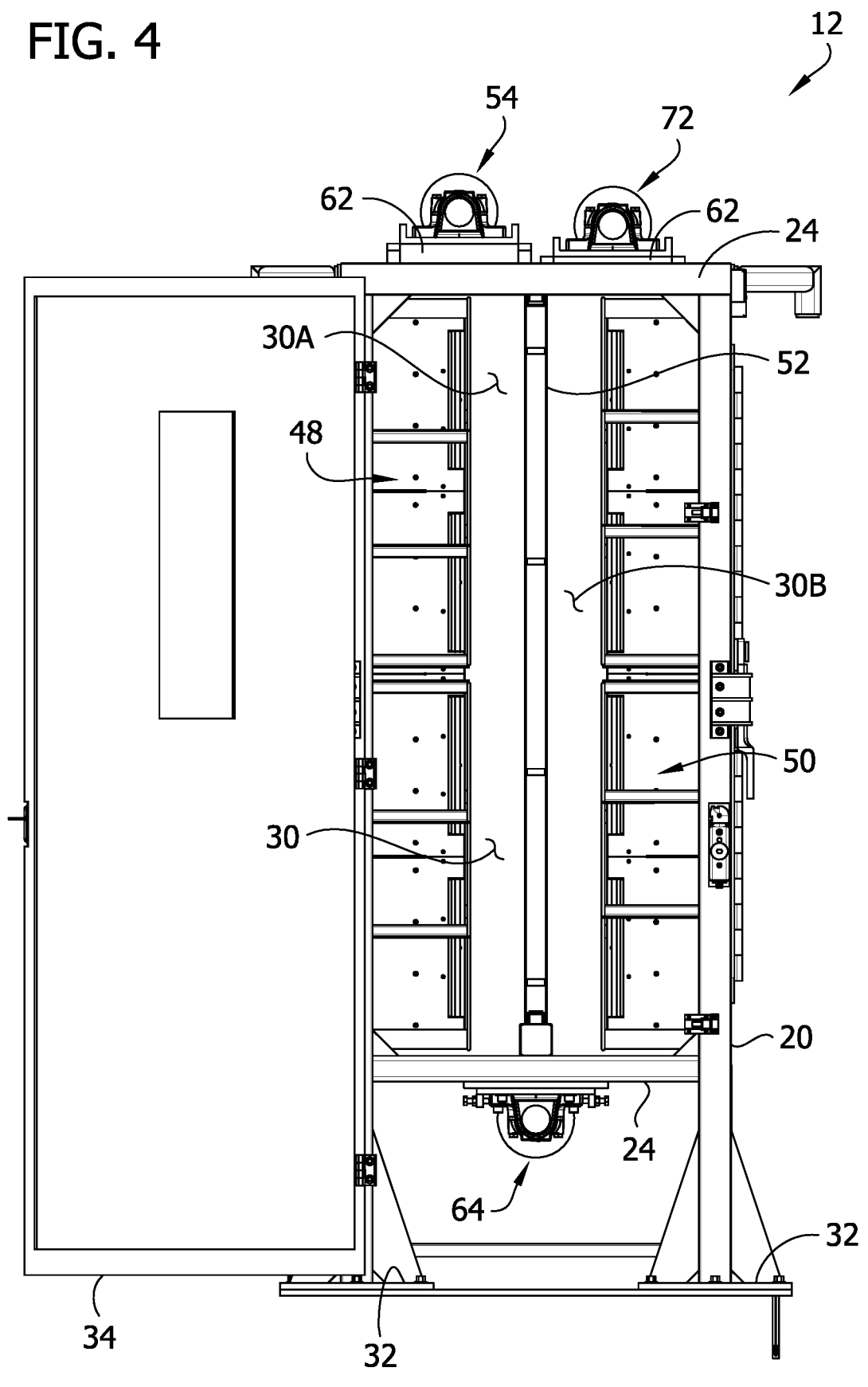
FIG. 4 is an end elevation of the heating system with a door opened to reveal internal construction.

A first heater array 48 (or "heater wall") is mounted on one of the wider sides of the box structure 18 and a second heater array 50 (or "heater wall") is mounted on the opposite wide side of the box structure. Each of the first and second heater arrays 48, 50 includes multiple heating units, which will be described more fully hereinafter. A reflector plate 52 is mounted inside the box structure 18 and divides the passageway 30 into an entry portion 30A and an exit portion 30B (see, FIG. 4). The passageway 30 turns back on itself so that the entry portion 30A and the exit portion 30B are generally side-by-side. The reflector plate 52 is constructed to reflect radiant heat on each side of the reflector plate. Therefore, radiant heat from the first heater array 48 directed through the entry portion 30A of the passageway 30 is reflected by the reflector plate 52 back into the entry portion of the passageway. Similarly, radiant heat from the second heater array 50 directed through the exit portion 30B of the passageway 30 is reflected by the reflector plate 52 back into the exit portion of the passageway. In this way, the entry portion 30A of the passageway 30 and the exit portion 30B of the passageway are thermally separated from each other.

An input roller 54 for receiving the web W of polyethylene film from the polyethylene film delivery unit 10 includes a roll 56 and journals 58 received in bushings 60. The bushings 60 are mounted on respective pads 62 attached to the top of the box structure 18, thereby mounting the input roller 54 on the frame of the heating system 12. A return roller 64 includes a roll 66 and journals (not visible in the drawings) received in respective bushings 70. The bushings 70 of the return roller 64 are mounted on the underside of the box structure 18 in a manner similar to the input roller 54. An output roller 72 also includes a roll 74 and has journals 76 received in bushings 78. The bushings of the output roller 72 are mounted on pads 80 attached to the top of the box structure 18. The input roller 54 is position for turning the web W of polyethylene film coming from the polyethylene film delivery unit 10 downward into the entry opening into the entry portion 30A of the passageway 30. Thus, the web W passes in a vertically downward direction through the entry portion 30A of the passageway 30 between the first heater array 48 and the reflector plate 52. The return roller 64 is located at the bottom generally in the middle of the box structure 18. The return roller 64 turns the web W from its generally downward path to an upward path into the exit portion 30B of the passageway 30. Thus, the web W moves generally vertically upward through the exit portion 30B of the passageway 30 between the second heater array 50 and the reflector plate 52.

Figure 5:
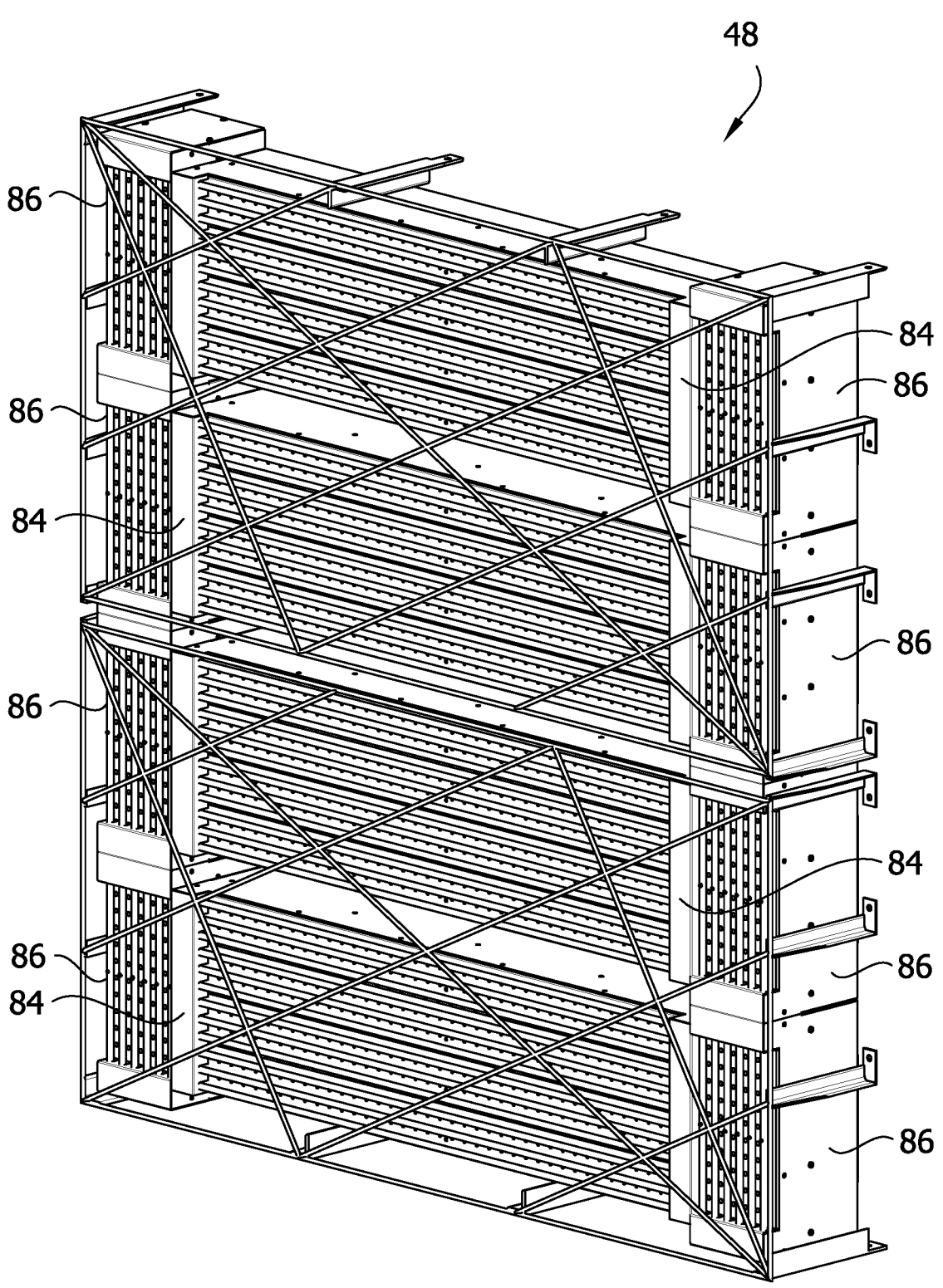
FIG. 5 is an enlarged elevation of a heating wall on one side of the heating system.
Figure 6:
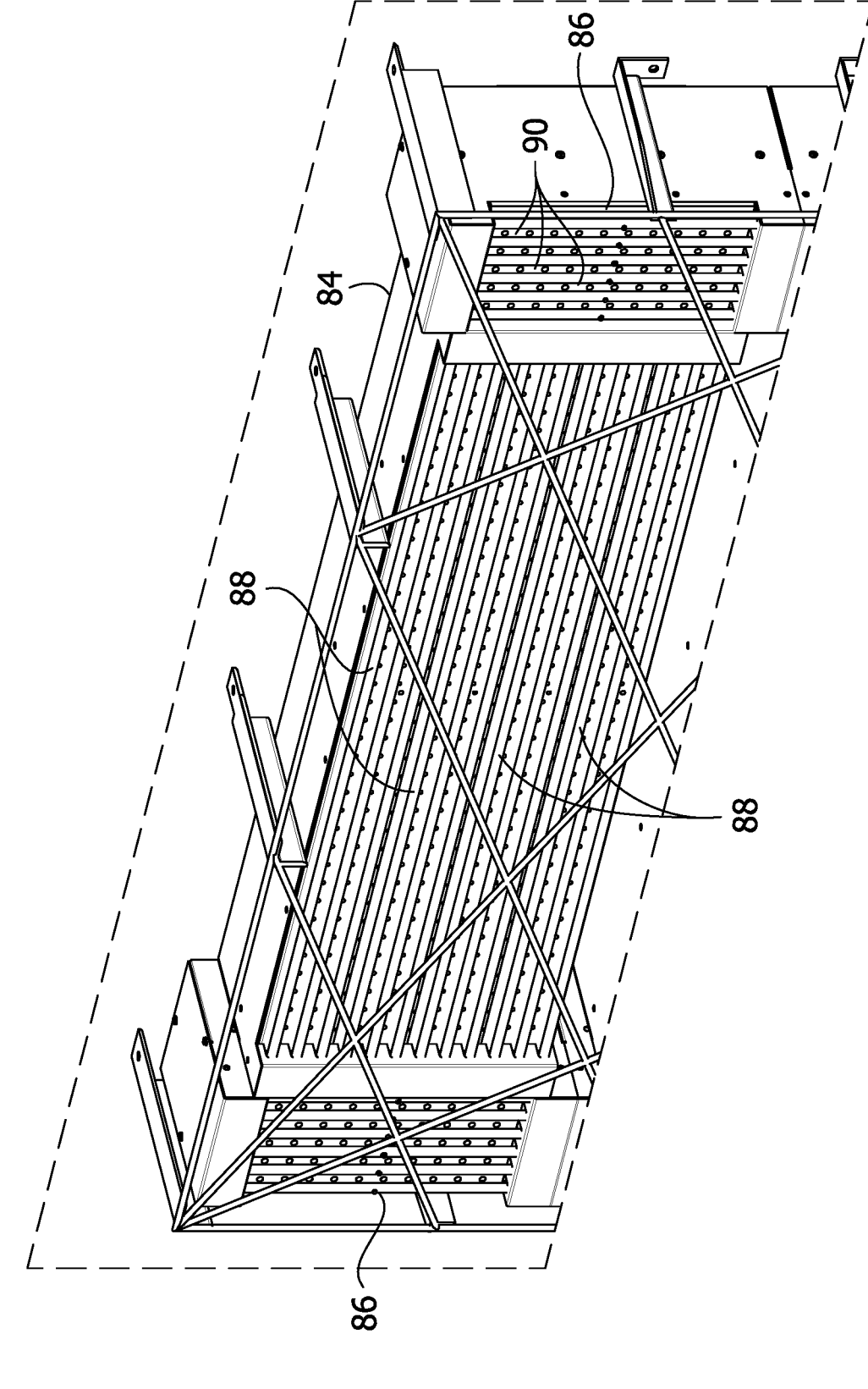
FIG. 6 is a further enlarged, fragmentary portion of the heating wall.

Referring now to FIGS. 5 and 6, each of the first and second heater arrays 48, 50 includes a number of heating units. The heating units are arranged along the length of the passageway 30 for applying heat to the web W of polyethylene film. In the illustrated embodiment, each of the first and second heater arrays 48, 50 has the same composition of heating units. Therefore, the following description of the first heater array 48 will suffice also for the second heater array 50. It is to be understood that the first and second heater arrays 48, 50 may be composed differently from each other within the scope of the present invention. The first heater array 48 includes four horizontally elongate center heating units 84 stacked one upon the other in the center of the first heater array. There are four vertically stacked side heating units 86 on each side of the center heating units 84, giving a total of twelve heating units in the first heater array 48. In a preferred embodiment, each of the heating units 84, 86 is independently controlled. However, it will be understood that one or more of the heating units 84, 86 could be controlled together. Each heating unit 84, 86 can form a section of a heating zone of the heating system 12. However, groups of heating units 84, 86 may form a section of a heating zone. For example, one center heating unit 84 and two side heating units 86 on either horizontal end of the center heating unit may form a section of a heating zone of the heating system 12. Still further the side heating units 86 may form a separate section or sections of a heating zone from the horizontally adjacent center heating unit 84. Other combinations of heating units 84, 86 could form a section of a heating zone. Moreover, the number of heating units may be other than shown in the drawings. In one embodiment, the side heating units 86 form heating sections which apply more radiant heat to the web W than the horizontally adjacent center heating unit 84. Sensing devices (not shown) on the heating units 84, 86 and/or in the passageway 30 provide information regarding temperature, including specifically temperature of the web W at various locations. In particular, temperature of the web W near its longitudinal edge margins and in its center at locations along the length of the passageway 30 are collected. This information is used to determine how the heating units are controlled. For example, the thickness of the web W of polyethylene film is generally greater at the longitudinal edge margins that in the central portions of the web. Accordingly, more radiant heat may be applied to the edge margins of the web W (by the side heating units 86) than to the center to keep the material in a state that is conducive to orientation of the structure to produce greater strength or other desired qualities of the polyethylene web.

As best seen in FIG. 6, the center heating units 84 each include heating elements 88 which are elongate along a heating element axis. These heating elements 88 are preferentially arranged to provide radiant heat to the center portion of the polyethylene web W. The heating element axis of the heating elements 88 is transverse to the longitudinal edge margins of the web W. The side heating units 86 each include heating elements 90 elongate along a heating element axis which is parallel to the longitudinal edge of the web W. These heating elements 90 are positioned to preferentially apply heat to the longitudinal edge margins of the web W. It is the side heating units 86 that would be controlled to deliver more radiant to the thicker longitudinal edge margins of the web W.

The heating system 12 can be used in a method of making biaxially oriented polyethylene film. As noted above, the polyethylene film web W is fed from the polyethylene film delivery unit 10 to the heating system 12. More specifically the web W passes over a roller 92 of the delivery unit 10 to the input roller 54 of the heating system 12. The web W is passed through the heating system 12 over the input roller 54, the return roller 64 and the output roller 72. Collectively, these rollers 54, 64, 72 can be considered "material handling rollers" of the heating system 12. The web W passes first downward through the entry portion 30A of the passageway 30, and then upward through the exit portion 30B of the passageway. In the entry portion 30A radiant heat is applied to the web W by the first heater array 48 and in the exit portion 30B heat is applied to the web by the second heater array 48. In one embodiment, more heat is applied from the side heating units 86 to the longitudinal edge margins of the web W, than is applied by the center heating units 84 to the central portion of the web. This allows the polyethylene to have a greater uniformity in material state through the web W. The properties of the material of the web W can then be further affected by stretching. This can be done in a number of suitable ways know to those of ordinary skill in the art. In one example, one or more of the rollers may be run more slowly to produce stretching of the polyethylene material. In one embodiment the web W is stretched along two axes to produce biaxially oriented polyethylene film.

A feature of at least some embodiments is that the input, return and output rollers 54, 64, 72 are not heated. All of the heat is supplied by the first and second heater arrays 48, 50. The radiant heat supplied by each of the heating units 84, 86 can be independently controlled to maintain the polyethylene at a temperature (and corresponding material state) that is most conducive to producing desired material characteristics (e.g., increased strength, resistance to puncture, increased ductility, etc.). In one embodiment, the web material is annealed. It may be that the requirements for radiant heat change as the web W progresses along the passageway 30. The heating units 84, 86 can be controlled to meet this requirement as well.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A method of making a biaxially oriented polymer film comprising:
feeding a film of polymer material to material handling rollers, the film having a length, a width, longitudinal edge margins and a central portion bounded by the longitudinal edge margins;
passing the film from one of the material handling roller to the next through a heating zone located between the one material handling roller and the next material handling roller;
applying heat to the film in the heating zone such that more heat is applied to the longitudinal edge margins than to the central portion of the film;
stretching the film between the material handling rollers in the heating zone.

2. The method of claim 1 wherein the material handling rollers are unheated.

3. A method of of making a biaxially oriented polymer film comprising:
feeding a film of polymer material to material handling rollers, the film having a length, a width, longitudinal edge margins and a central portion bounded by the longitudinal edge margins;
passing the film from one of the material handling roller to the next through a heating zone;
applying heat to the film in the heating zone;
wherein passing the film through the heating zone comprises moving the film in a first direction through a first portion of the heating zone and moving the film in a second direction through a second portion of the heating zone, wherein the second direction is different than the first direction.

4. The method of claim 3 wherein the first direction is generally vertically downward and the second direction is generally vertically upward.

5. The method of claim 1 wherein passing the film through the heating zones comprises moving the film passing the film through multiple heating sections in the heating zone and independently controlling the heating sections for applying different amounts of heat to the film within the heating zone.

6. The method of claim 5 wherein independently controlling the heating sections comprises controlling a first section to apply heat to the film, controlling one or more middle sections to apply no heat to the film and controlling a final section to apply heat to the film thereby to produce annealing of the film.

7. The method of claim 1 wherein applying heat to the film comprises applying radiant heat to the film.

8. A method of making a biaxially oriented polyethylene film comprising:

feeding a film of polyethylene material to material handling rollers, the film having a length, a width, longitudinal edge margins and a central portion bounded by the longitudinal edge margins;

passing the film from one of the material handling roller to the next through a heating zone in a feed direction;

applying radiant heat to the film in the heating zone including plural heating sections positioned in different locations along the feed direction;

sensing a temperature of the film at locations in the heating zone and collecting temperature data;

independently controlling the heating sections using the temperature data to applying different amounts of heat to the film as the film passing through different ones of the heating sections.

9. The method of claim 8 wherein the material handling rollers are unheated.

10. The method of claim 8 wherein passing the film through the heating zone comprises moving the film in a first direction through a first portion of the heating zone and moving the film in a second direction through a second portion of the heating zone, wherein the second direction is different than the first direction.

11. The method of claim 10 wherein the first direction is generally vertically downward and the second direction is generally vertically upward.

12. The method of claim 8 wherein independently controlling the heating sections comprises controlling a first section to apply heat to the film, controlling one or more middle sections to apply no heat to the film and controlling a final section to apply heat to the film thereby to produce annealing of the film.

13. A heating system for producing polymer film, the heating system comprising:

a frame forming a passageway sized and shaped to receive a web of film into and through the frame, the web of film having longitudinal edge margins and a central portion between the longitudinal edge margins;

heating units arranged along a length of the passageway for applying radiant heat from the heating units to the film passing through the passageway, the heating units being independently controllable for applying different amounts of heat to different portions of the passageway along the length of the passageway, and least some of the heating units being positioned for applying heat preferentially to the longitudinal edge margins of the film;

each of the heating units include heating elements which are elongate along a heating element axis, the heating units positioned for applying radiant heat preferentially to the longitudinal edge margins being arranged so that the heating element axis is generally parallel to the longitudinal edge margin of the film.

14. The heating system of claim 13 wherein at least some of the heating units are arranged for preferentially applying radiant heat to the central portion of the film, the heating elements of the heating units arranged for preferentially applying radiant heat to the central portion of the film being arranged so that the heating element axis is transverse to the longitudinal edge margins of the film.

15. A heating system for producing polymer film, the heating system comprising:

a frame forming a passageway sized and shaped to receive a web of film into and through the frame, the web of film having longitudinal edge margins and a central portion between the longitudinal edge margins;

heating units arranged along a length of the passageway for applying radiant heat from the heating units to the film passing through the passageway, the heating units being independently controllable for applying different amounts of heat to different portions of the passageway along the length of the passageway, and least some of the heating units being positioned for applying heat preferentially to the longitudinal edge margins of the film;

wherein the passageway includes a first portion and a second portion, the first and second portions being generally side-by side.

16. The heating system of claim 15 wherein the heating units are disposed on an exterior wall of the frame in the first portion and on opposite exterior wall of the frame in the second portion.

17. The heating system of claim 16 further comprising a reflector plate positioned between the first and second portions of the passageway.

18. The heating system of claim 15 wherein the first portion and the second portion of the passageway are arranged vertically.

19. The heating system of claim 18 further comprising rollers mounted on the frame for changing a direction of movement of the web of film from a vertically downward direction in the first portion of the passageway to a vertically upward direction in the second portion of the passageway.

\* \* \* \* \*